(12) United States Patent  (10) Patent No.: US 9,086,530 B2
Kamimura  (45) Date of Patent: Jul. 21, 2015

(54) OPTICAL EQUIPMENT (75) Inventor: Masayuki Kamimura, Tokyo (JP)

(73) Assignee: PENTAX RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 13/557,588

(22) Filed: Jul. 25, 2012

(65) Prior Publication Data
US 2013/0028584 A1 Jan. 31, 2013

(30) Foreign Application Priority Data

Jul. 29, 2011 (JP) ................................ 2011-166727

(51) Int. Cl.
G03B 13/30 (2006.01)
G03B 13/36 (2006.01)
G02B 7/08 (2006.01)
G03B 3/10 (2006.01)
G03B 7/26 (2006.01)

(52) U.S. Cl.
CPC .. G02B 7/08 (2013.01); G03B 3/10 (2013.01); G03B 7/26 (2013.01); G03B 13/30 (2013.01); G03B 13/36 (2013.01); G03B 2217/007 (2013.01)

(58) Field of Classification Search
USPC .................................................. 396/133, 135
See application file for complete search history.

(56) References Cited

U.S. PATENT DOCUMENTS

| | | | |
|---|---|---|---|
| 5,594,311 A | 1/1997 | Yasuda et al. | |
| 6,055,378 A | 4/2000 | Oono et al. | |
| 7,414,746 B2 * | 8/2008 | Tanaka et al. | 358/1.15 |
| 2008/0187304 A1 * | 8/2008 | Hirose | 396/260 |

FOREIGN PATENT DOCUMENTS

| | | | | |
|---|---|---|---|---|
| JP | 07-077648 | 3/1995 | | |
| JP | 10-224680 | 8/1998 | | |
| JP | 11-127598 | 5/1999 | | |
| JP | 11261873 A * | 9/1999 | ............ | H04N 5/232 |
| JP | 2001-245494 | 9/2001 | | |
| JP | 2003-066313 | 3/2003 | | |
| JP | 2006-060925 | 3/2006 | | |
| JP | 2006-158019 A | 6/2006 | | |
| JP | 2008-109193 | 5/2008 | | |

OTHER PUBLICATIONS

U.S. Appl. No. 13/557,576 to Kamimura, filed Jul. 25, 2012.
U.S. Appl. No. 13/554,187 to Kamimura, filed Jul. 20, 2012.
U.S. Appl. No. 13/529,100 to Kamimura, filed Jun. 21, 2012.
U.S. Appl. No. 13/525,468 to Kamimura, filed Jun. 18, 2012.

* cited by examiner

*Primary Examiner* — Clayton E Laballe
*Assistant Examiner* — Noam Reisner
(74) *Attorney, Agent, or Firm* — Greenblum & Bernstein P.L.C.

(57) ABSTRACT

Optical equipment capable of stopping a lens in a position producing no image blur and requiring low power consumption is provided. The optical equipment includes a lens driving unit for driving a focusing lens. The equipment further includes a drive-setting unit configured to set an optimal drive amount for positioning the focusing lens at an appropriate focal depth while minimizing the amount of power consumed in the process. The optical equipment includes a lens position-control unit that controls the lens driving unit based on the drive amount set by the drive-setting unit controlling the movement of the focusing lens. The lens position-control unit can stop the lens in a position producing no image blur and requiring low power consumption.

3 Claims, 8 Drawing Sheets

OPTICAL EQUIPMENT

BACKGROUND OF THE INVENTION

1. Field of the Invention

The present invention relates to optical equipment, in particular a lens position-control device for controlling a lens driving device.

2. Description of the Related Art

Hitherto, various attempts for low power consumption have been developed in digital cameras. As a result of one of these attempts, there is known a structure for reducing power consumption by a step motor used in an image stabilization mechanism, as described in Japanese Unexamined Patent Publication No. 2006-158019. In this structure, after image stabilization a magnetic pole of the step motor is moved from its stopping position to a more stable position and thereafter, the supply of excitation power to the step motor is stopped. With this structure, it is possible to prevent image blurring caused by an expected movement of the magnetic pole to the stable position at the time of imaging, and it is also possible to reduce power consumption of the step motor. This structure is also applicable to an autofocus mechanism for controlling the lens position with the use of a step motor.

In the application of the above-mentioned structure for an autofocus mechanism, however, a problem arises when the magnetic pole is simply moved to a position requiring low power consumption. This is because the stopping position of the magnetic pole is associated with the stopping position of the lens. Namely, there is a possibility of image blurring after the movement of the magnetic pole despite completion of a focusing operation before the movement of the magnetic pole. This image blurring has a tendency of gradually intensifying as the light-receiving pixel pitch decreases. In recent years digital cameras have come equipped with an image pickup device whose number of pixels has been dramatically increased to provide high resolution images, and therefore, image blurring should be eliminated since the light-receiving pixel pitch of such a digital camera is small. Therefore, an object of the present invention is to provide optical equipment capable of stopping a lens, namely, a magnetic pole in a position producing no image blur and requiring low power consumption.

SUMMARY OF THE INVENTION

Therefore, an object of the present invention is to provide optical equipment capable of stopping a lens, namely, a magnetic pole in a position producing no image blur and requiring low power consumption.

According to the present invention, optical equipment is provided comprising: a lens driving unit supplied with electric power to drive a focusing lens; A drive-setting unit configured to set an optimal drive amount for positioning the focusing lens at an appropriate focal depth while minimizing the amount of power consumed in the process; and a lens position-control unit configured to control the lens driving unit based on the drive amount set by the drive-setting unit, thereby controlling the movement of the focusing lens.

According to the present invention, there is also provided a camera comprising a camera body, a lens barrel mounted on the camera body, a lens driving unit arranged in the lens barrel and supplied with electric power from the camera body to drive a focusing lens, a drive-setting unit configured to set an optimal drive amount for positioning the focusing lens at an appropriate focal depth while minimizing the amount of power consumed in the process, and a lens position-control unit configured to control the lens driving unit based on the drive amount set by the drive-setting unit, thereby controlling the movement of the focusing lens.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

Figure 1:
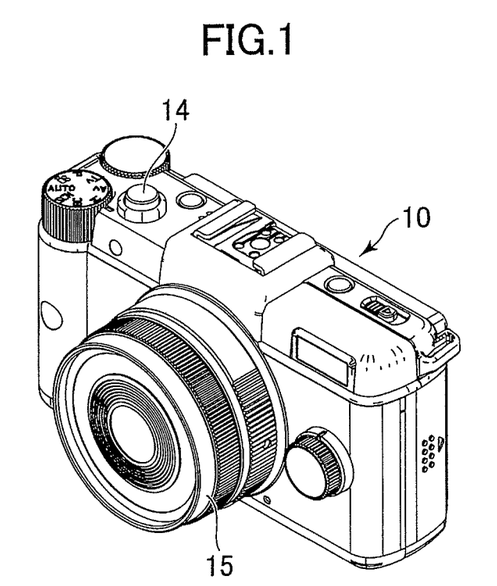
FIG. 1 is an overall view of a camera in accordance with an embodiment of the present invention.
Figure 2:
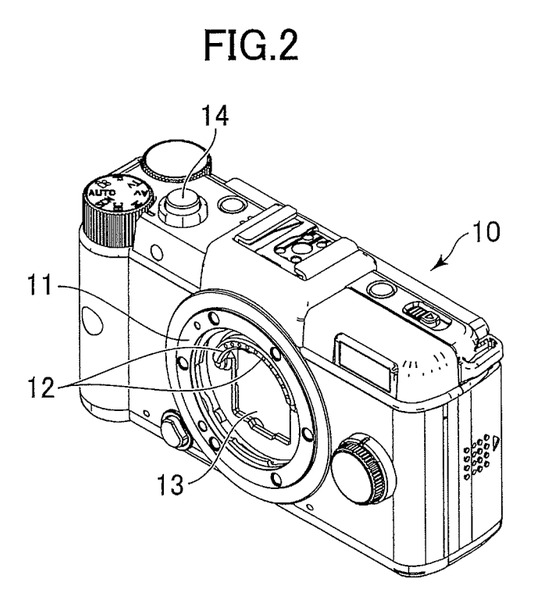
FIG. 2 is a view of the camera with its lens removed and the application of the featured embodiment of the present invention.

One embodiment of the present invention will be described with reference to the drawings below. FIG. 1 shows the appearance of an interchangeable-lens camera, while FIG. 2 shows the camera when a lens barrel 15 has been removed from a camera body 10. In this illustrated camera system, the lens barrel 15 is detachably mounted on the camera body 10.

In the camera body 10, a plurality of electrical contacts 12 are circumferentially arranged on the inner peripheral side of a lens mount 11. Located below the electrical contacts 12 is an image pickup unit 13 accommodating imaging elements (not shown). When the camera body 10 is powered on, a moving image can be produced by the imaging elements and further displayed on a monitor (not shown). A shutter button 14 is arranged on a top surface of the camera body 10.

The electrical constitution of this camera will be described with reference to FIG. 3. In the camera body 10, a camera processor 20 is connected to a body-side lens power source 22 for supplying the lens barrel 15 with electric power and an image sensor 24 for converting light collected by a lens to electrical signals. The body-side lens power source 22 and the image sensor 24 are control led by the camera processor 20.

In the lens barrel 15, a lens CPU 30 is connected to a lens-side lens power source 32 for supplying the lens CPU 30 with electric power. Also connected to the lens CPU 30 are an AF motor 36 (lens driving unit) which controls the position of an AF lens (focusing lens) 34 and a motor driver 38 which controls voltage to the AF motor 36. The AF motor 36 and the motor driver 38 are controlled together by the lens CPU 30 and supplied with electric power. A lens position sensor 40 is connected to the AF lens 34 to transmit the position of the AF lens 34 to the CPU 30. In an EEPROM 31 provided in the lens CPU 30 information is recorded, e.g., optical information, which is necessary for driving the AF lens 34.

The camera processor 20 and the lens CPU 30 are connected to each other through the electrical contacts 12 (see FIG. 12), thereby allowing mutual communication. Further, the body-side lens power source 22 and the lens-side lens power source 32 are also connected to each other through the electrical contacts 12, so that the lens-side lens power source 32 is supplied with electrical power from the body-side lens power source 22.

Figure 4:
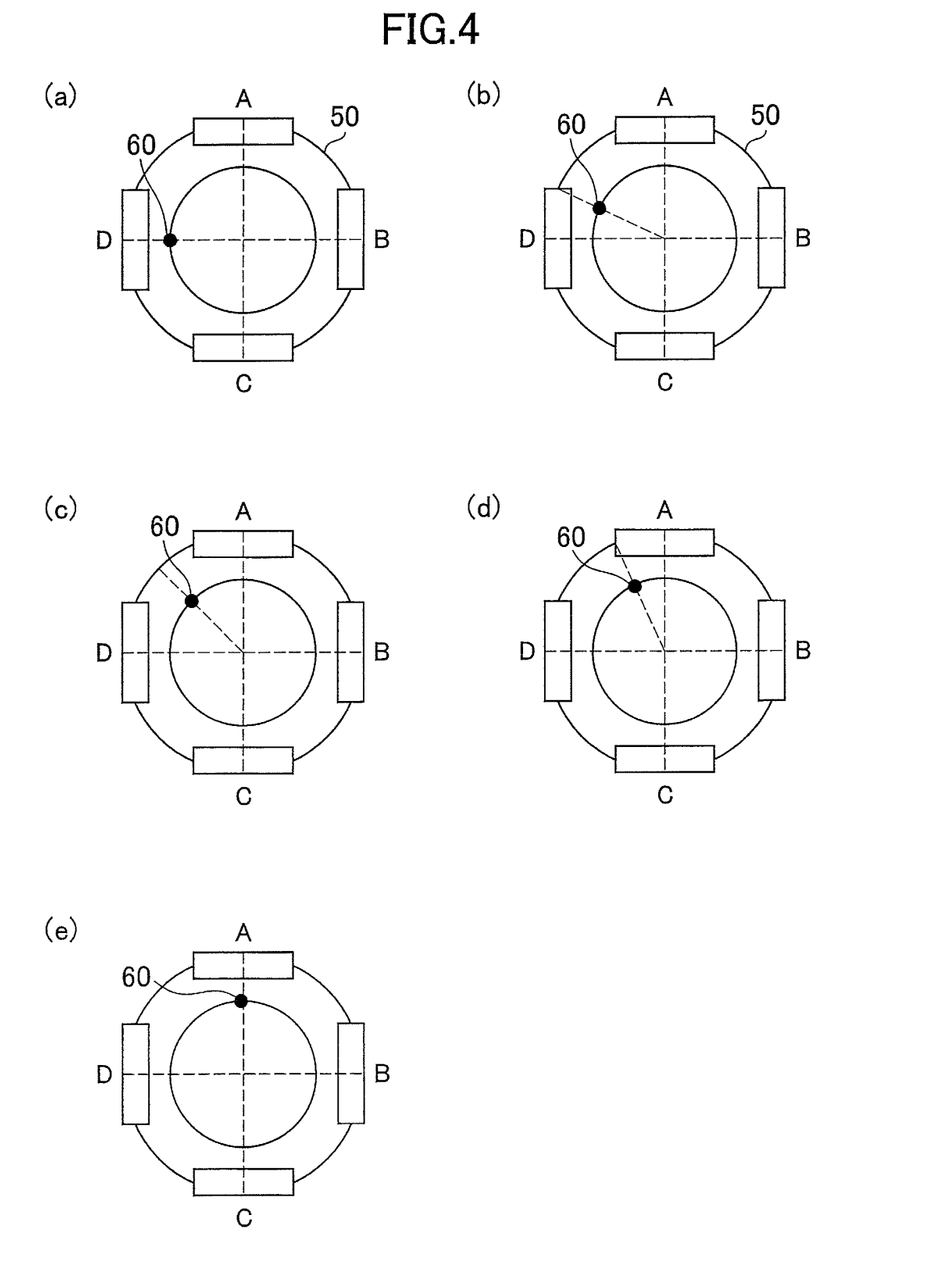
FIG. 4 is a schematic view of a step motor in the featured embodiment of the present invention.
Figure 5:
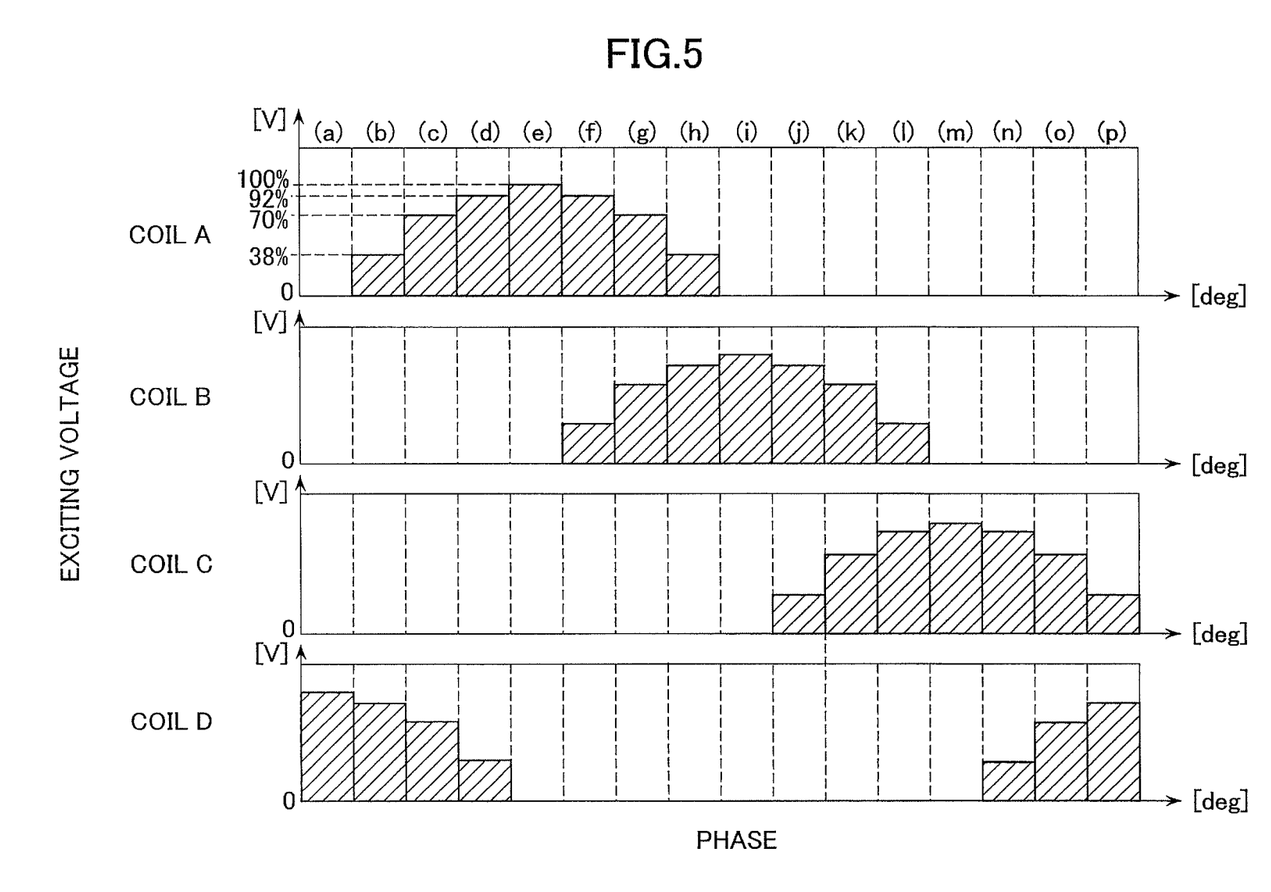
FIG. 5 is a view showing voltages applied to the step motor in the featured embodiment of the present invention.

FIG. 4 is a schematic view of a step motor 50 installed in the AF motor 36. FIG. 5 is a view showing a relationship between voltages applied to stator coils A to D and the phase of a magnetic pole 60 on the rotor. In FIG. 5, the horizontal axis represents the phase of the magnetic pole 60, while the vertical axis represents the voltages. The operation of the step motor 50 in micro-step driving will be described with reference to FIGS. 4 and 5. Suppose, for simplicity, the magnetic pole 60 is a south pole and each of coils A to D becomes a north pole when an excitation voltage is applied thereto.

In the state (a) of FIG. 4 and the state (a) of FIG. 5, when a maximum excitation voltage is applied to only the coil D, it becomes a North pole, so that the magnetic pole 60, as a South pole, is attracted by the coil D to stop at an initial position (initial phase). Next, in the state (b), 38% of the maximum excitation voltage is applied to the coil A and 92% of the maximum is applied to the coil D. Then, the magnetic pole 60 is attracted to both the coil A and the coil D, specifically to a position closer to the coil D and thus suspended there. In the state (c), 50% of the maximum excitation voltage is applied to the coil A and 50% of the maximum to coil D. Then, the magnetic pole 60 is attracted to an intermediate position between the coil A and the coil D and thus suspended there. In the state (d), 92% of the maximum excitation voltage is applied to the coil A and 38% of the maximum to the coil D. Then, the magnetic pole 60 is attracted to both the coil A and the coil D, specifically to a position closer to the coil A and thus suspended there. In the state (e), the maximum excitation voltage is applied to only the coil A, thus causing the magnetic pole 60 to be attracted to the coil A and be suspended there. In this way, the position of the magnetic pole 60 depends on a ratio between respective excitation voltages applied to the coils A and D. The magnetic pole 60 is rotated through the states (a) to (e), covering an angle of 90 degrees from the initial position.

Figure 6:
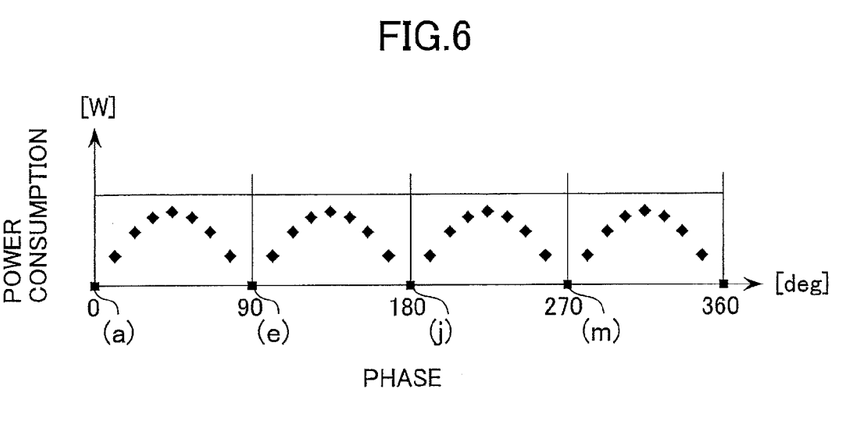
FIG. 6 is a graph showing the power consumption profile of the step motor when operated under micro-step driving conditions in the featured embodiment of the present invention.

FIG. 6 is a graph showing the relationship between the phase of the magnetic pole 60 and the power consumption. In the figure, the horizontal axis represents the phase of the magnetic pole 60, while the vertical axis represents the power consumption of the step motor 50. In FIG. 6, the numbered states (a), (e), (i) and (m) correspond to the same-numbered states in FIGS. 4 and 5.

Namely, in the state (a) of FIG. 6, the excitation voltage is applied to only the coil D, so that the magnetic pole 60 stops in the initial position (see FIG. 4). In the state (e), the excitation voltage is applied to only the coil A, so that the magnetic pole 60 stops in a position on rotated 90 degrees from the initial position. In the state (j), the excitation voltage is applied to only the coil B, so that the magnetic pole 60 stops in a position rotated 180 degrees from the initial position. In the state (m), the excitation voltage is applied to only the coil C, so that the magnetic pole 60 stops in a position on rotated 270 degrees from the initial position. Thus, in each of the states (a), (e), (i) and (m), the excitation voltage is applied to only one of the 4 coils. Here, these states will be referred to as "single-phase driving states", respectively. In the single-phase driving states, power consumption is minimized relative to the other states. Additionally, both the respective positions of the magnetic pole 60 and the respective discrete lens positions along the optical axis of the AF lens 34 at the time of the single-phase driving states will be referred to as "single-phase positions", respectively.

Figure 7:
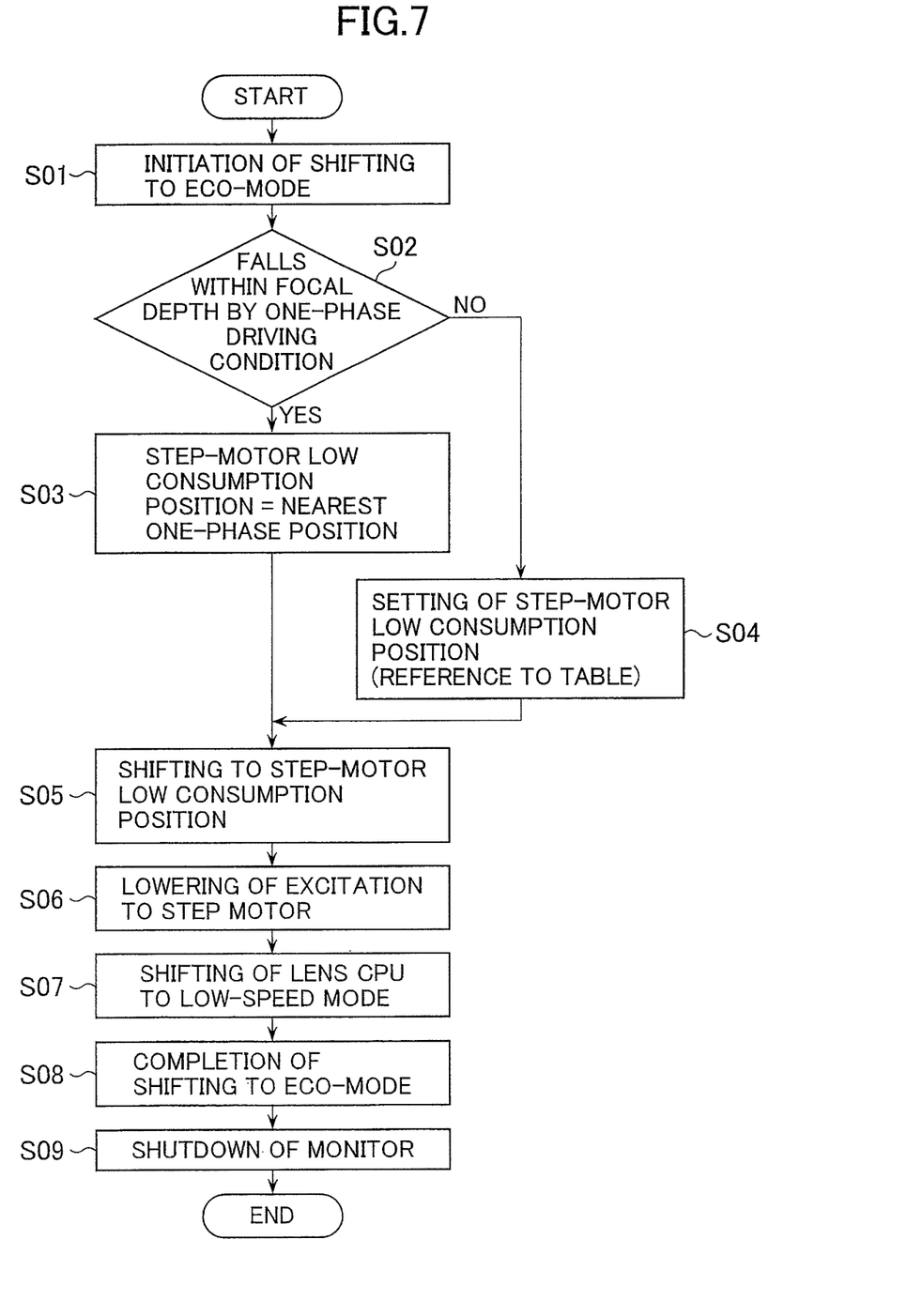
FIG. 7 is a flow chart outlining the steps for shifting to an eco-mode in the featured embodiment of the present invention.

FIG. 7 is a flow chart of the operation for shifting from the normal mode to the eco-mode with reduced power consumption. The shifting to the eco-mode is initiated when the camera body 10 (see FIG. 1) and the lens barrel 15 are operated for a certain period, about 10 seconds for example. The eco-mode designates a condition where the power consumption of the camera body 10 and the lens barrel 15 are both low. The operations at steps S01 and S09 correspond to processes for shifting to the eco-mode on the camera-body side, while the operations at steps S02 to S08 correspond to processes for shifting to the eco-mode on the side of the lens barrel 15.

At step S01, the computing speed of the camera processor 20 is reduced to increase the power consumption of the camera body 10, so that its frame rate and the brightness of a monitor are reduced. At step S02, a determination is made on the side of the lens barrel 15 as to whether or not the lens position falls within a focal depth when the magnetic pole 60 is moved to the nearest single-phase position from the current position. This determination is made with reference to a table (not shown) containing the relationship between the focal depth and the lens position. The focal depth depends on the permissible circle of confusion and the F-number. Again, as the focal depth changes with the F-number, this relationship is known in advance and stored in the form of a table, for example, in the EEPROM 31 in the lens CPU 30. By referring to this table, it is possible to ascertain what lens drive amount is required to move the AF lens 34 from the current position within the focal depth, in other words, an angle of rotation the magnetic pole 60. That is, at step S02, the determination as to whether or not the AF lens 34 can be moved to the single-phase position is accomplished by determining whether or not the present position resulting from a maximum lens drive amount within the focal depth is too far from the nearest single-phase position.

Figure 8:
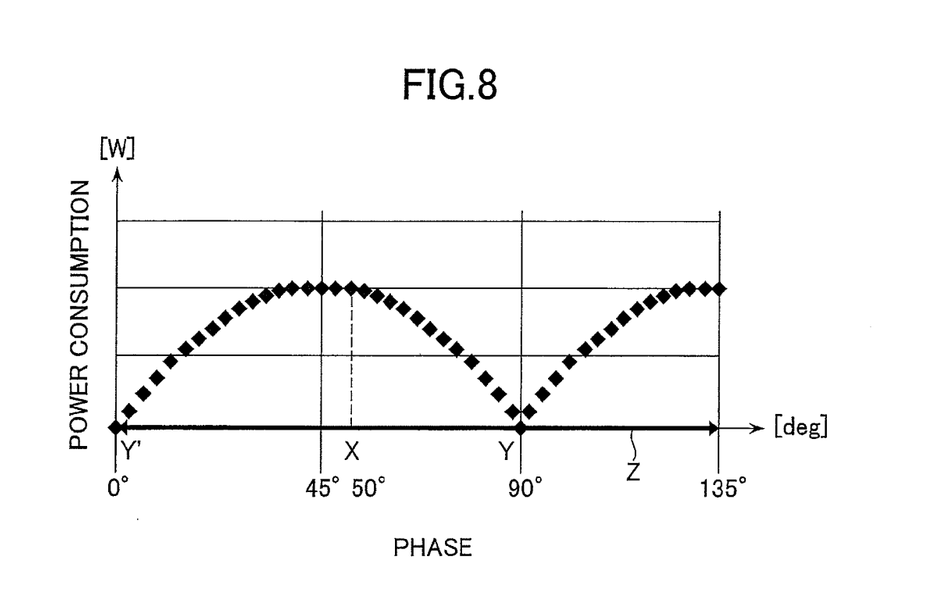
FIG. 8 is a graph showing a relationship between rotating angle and power consumption when the decision at step S02 is Yes for the featured embodiment of the present invention.

FIG. 8 specifically shows such a situation where the determination at step S02 is "Yes". In FIG. 8, the horizontal axis designates the phase of the magnetic pole 60, while the vertical axis designates the power consumption of the AF motor 36. Additionally, an arrow on the horizontal axis illustrates the allowable angle of rotation Z, which is obtained by converting the range of the focal position of the AF lens 34 that falls within the focal depth to the corresponding angle of rotation of the magnetic pole 60. Suppose, in the determination of the focused state at step S02, the magnetic pole 60 is located in a position X that is rotated by angle of 50 degrees from the initial position. The allowable angle of rotation Z includes both zero and 90 degrees for the single-phase position. Thus, when the magnetic pole 60 is shifted to the single-phase position, it is determined that the AF lens 34 can move to the single-phase position within the focal depth. That is, it is found that even if the magnetic pole 60 is moved to the single-phase position Y or the single-phase position Y', the image blur is too small to be recognized.

In FIG. 7, if the determination at step S02 is "Yes", then the routine goes to step S03 where it is determined that the nearest single-phase position to the current stop position X is the position Y. At the next step S05, the magnetic pole 60 is shifted to the position Y. Such a situation occurs when the power consumption is minimized and the AF motor 36 allows the AF lens 34 to be suspended in a position that falls within the focal depth while in the single-phase driving state. In this way, at respective steps S02, S03 and S05, the lens can be suspended under conditions requiring minimized power consumption by appropriate control of the AF motor 36 (lens position-control unit). Then, power consumption is kept to a minimum while a blurred image whose blur cannot be recognized is displayed on the monitor.

Figure 3:
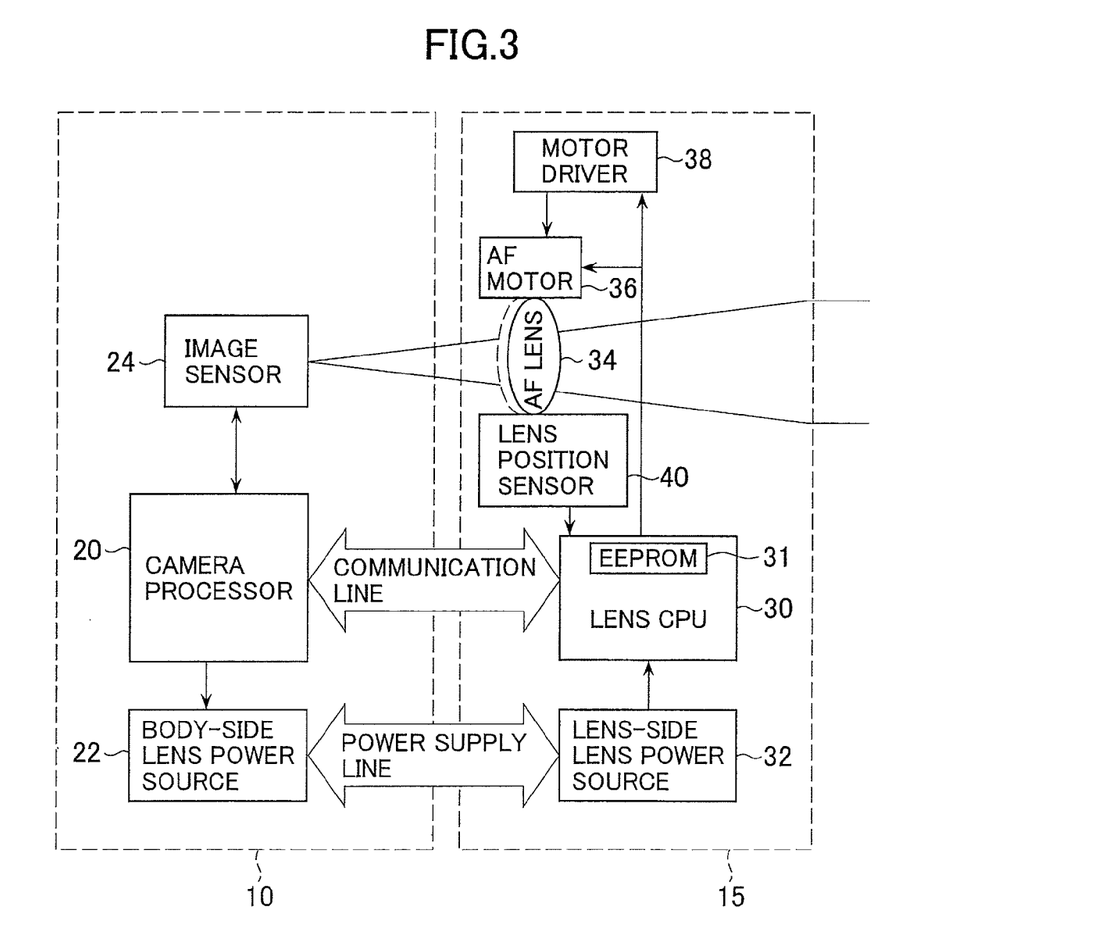
FIG. 3 is an electrical block diagram of the camera with the application of the featured embodiment of the present invention.

At this time, the position of the magnetic pole 60, namely, the position of the AF lens 34 is detected by the lens position sensor 40 and transmitted to the lens CPU 30 (see FIG. 3). When the condition of minimum power consumption is recognized by the lens CPU 30, the excitation voltage is decreased at step S06. When a voltage control signal is transmitted from the lens CPU 30 to the motor driver 38, the excitation voltage is decreased by the motor driver 38 (excitation control unit). Consequently, the magnetic pole 60 is suspended under a condition of low power consumption while maintaining a minimum static torque.

Subsequently, the computing speed of the lens CPU 30 is reduced at step S07. By reducing the computing speed of the lens CPU 30, it is possible to decrease the power consumption of the lens CPU 30 (CPU power control unit). Then, at step S08, the shifting operation to the eco-mode is completed.

If the camera body 10 and the lens barrel 15 are not operated for a certain period after shifting to the eco-mode is completed in the lens barrel 15, the power supply to the monitor is shut down at step S09. The power consumption is further reduced by the shutdown of power to the monitor.

Figure 9:
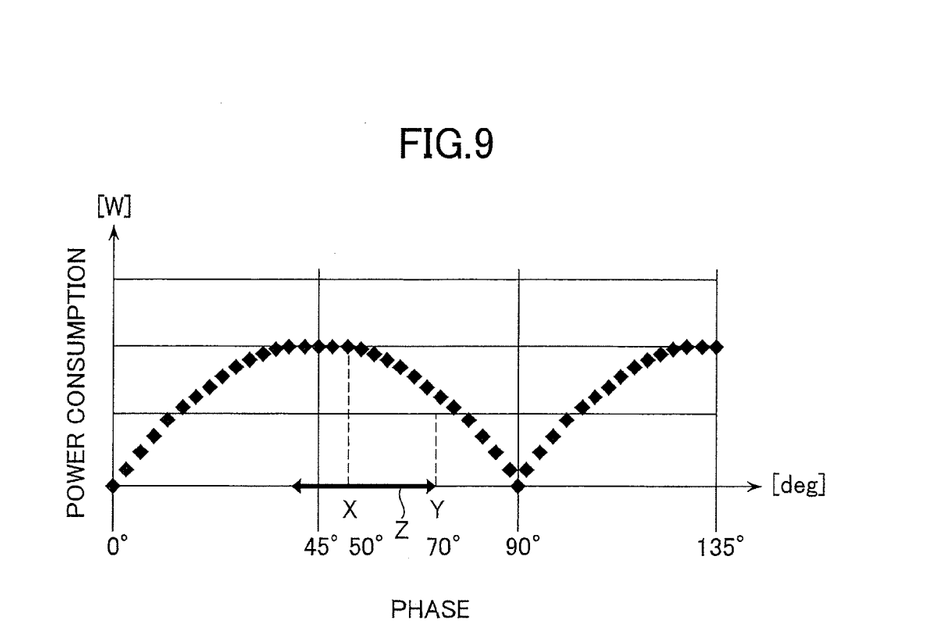
FIG. 9 is a graph showing a relationship between rotating angle and power consumption when the decision at step S02 is No for the featured embodiment of the present invention.

Meanwhile, FIG. 9 shows such a specific situation in which the decision at step S02 is "No". Suppose, in the decision at step S02, the magnetic pole 60 is located in the position X similar to above, affecting a focused state. In this example, the allowable angle of rotation of Z does not include 0 and 90 degrees as the single-phase position. Thus, when the magnetic pole 60 is shifted to the single-phase position, in other words, when the AF lens 34 is shifted to the nearest single-phase position from the present stop position, it is determined at step S02 that the focal position of the AF lens 34 has deviated from the focal depth. That is, if the magnetic pole 60 is moved to 0 or 90 degrees as the single-phase position, then the image blur worsens recognizably.

If the decision at step S02 is "No", then the routine goes to step S04 where it is determined that the position Y is a position where the power consumption is minimized within the allowable angle of rotation Z. This determination is accomplished with reference to a table prepared in advance, as mentioned before. That is, the nearest position to the single-phase position within the focal depth is set by referring to the table. In other words, a maximum drive amount for the AF lens 34 in the direction toward the nearest single-phase position from the current stop position is set while the AF lens 34 is in the current stop position (drive-setting unit). Then, at step S05, the magnetic pole 60 is moved to the position Y based on the set drive amount (lens position-control unit). In such a condition where the lens can be positioned within the focal depth while consuming relatively low power, the AF motor 36 is driven under power consumption conditions that are as close as possible to the single-phase driving condition while still allowing the AF lens 34 to be suspended in a position that falls within the focal depth. In this way, at respective steps S02, S04 and S05 the AF motor 36 can be controlled to suspend the lens within the focal depth as close as possible to a position that minimizes power consumption. Note, when the operation of step S05 is completed, the above-mentioned processes at steps S06 to S09 are carried out.

As mentioned above, in the processes of steps S01 to S09 it is possible to stop the lens in a position where the lens aberration is within the allowable range and the power consumption is low.

Figure 10:
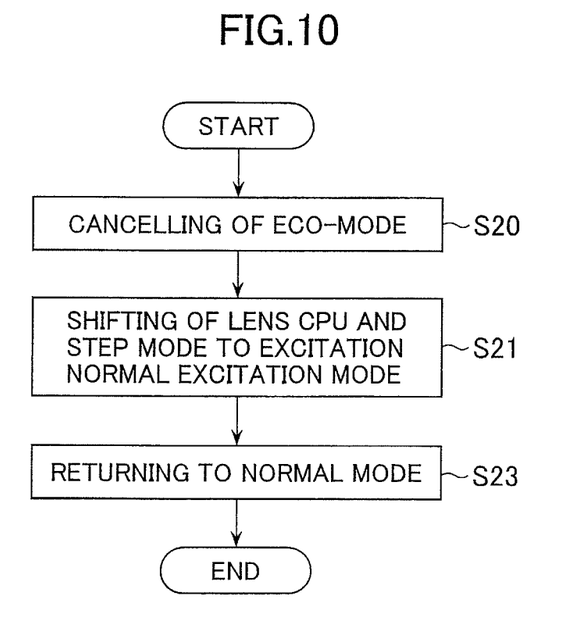
FIG. 10 is a flow chart outlining the steps for cancelling the eco-mode in the featured embodiment of the present invention.

The operation of canceling the eco-mode is illustrated in FIG. 10. At step S20, the canceling action of the eco-mode is initiated when the camera body 10 (see FIG. 1) or the lens barrel 15 is manipulated. The computing speed of the camera processor 20, the frame rate and the brightness of the monitor are reinstated at the same time. At step S21, the computing speed of the lens CPU 30 is returned to its normal state and additionally, the excitation voltage applied to the AF motor 36 is returned to its normal state. At step S23, the operation returns to the normal mode.

In this way, by increasing the excitation voltage and the computing speed of the lens CPU 30 at step S21 in advance of cancelling the eco-mode, it is possible to instantly return the equipment to the normal mode.

Note, regarding the step motor, it may comprise any type of motor so long as it can be operated under half-step and micro-step driving conditions etc, and further be equipped with coils. Although the step motor of this embodiment is adapted so as to rotate through 360 degrees in 16 steps, the number of steps can be established optionally. Moreover, at step S06 of FIG. 7, if the motor driver 38 does not have a function for controlling voltages, the excitation voltage may decreased by reducing the voltage supplied from the lens CPU 30 to the AF motor 36.

For simplicity of explanation, at step S02, the F-number of the lens barrel 15 is fixed. However, in case of a camera equipped with a lens barrel 15 having a variable F-number, such as a zoom lens, there may be provided a unit for detecting the F-number and also prepared tables for every F-number for the appropriate selection. According to the embodiment, additionally, the previously-prepared table is referred to for expediting processing in this embodiment. Instead of preparing the table in advance, the equipment may be constructed so as to calculate a focal depth from the information regarding the F-number and circle of least confusion, and also from the determination of whether or not a focal point resulting from driving the lens falls within the focal depth.

Further, when returning to the normal mode, the lens position may be brought back to an original position before shifting to the eco-mode. In this way, since either the lens position before shifting to the eco-mode or the lens displacement that occurs in the process of shifting to the eco-mode are registered in a memory (not shown) in the lens barrel 15, the lens position can be returned to the original lens position before shifting to the eco-mode.

As will be understood by those familiar with the art, the present invention may be embodied in other specific forms without departing from the spirit or essential characteristics thereof. For example, the description above assumes an embodiment where the present invention is applied to a digital camera, the present invention is not limited to this configuration and is also applicable to other optical equipment having a focusing lens, for example, an autofocus telescope, autofocus binocular glasses, etc. Accordingly, the disclosures and descriptions herein are intended to be illustrative, but not limiting, of the scope of the invention which is set forth in the following claims.

The present disclosure relates to subject matter contained in Japanese Patent Application No. 2011-166727 (filed on Jul. 29, 2011), which is expressly incorporated herein, by reference, in its entirety.

The invention claimed is:

1. Optical equipment, comprising:

a lens driver supplied with electric power to drive a focusing lens;

a drive-setter configured to set an optimal drive amount for positioning the focusing lens at a nearest position to a single phase position within a focal depth while minimizing an amount of power consumption; and a lens position-controller configured to control said lens driver based on the drive amount set by said drive-setter thereby controlling the movement of said focusing lens, wherein the power consumption is minimized while a blurred image, having a blur causing the blurring of the image to be unrecognizable, is displayed on a monitor, when the single phase position is not within the focal depth and the position of the focusing lens is within the focal depth, a magnetic pole of the lens driver is moved to a position nearest to the single phase position within the focal depth, and the position nearest to the single phase position is distinct from a position that minimizes image blur.

2. A camera, comprising:

a camera body;

a lens barrel mounted on said camera body;

a lens driver arranged in said lens barrel and supplied with electric power from said camera body to drive a focusing lens;

a drive-setter configured to set an optimal drive amount for positioning the focusing lens at a nearest position to a single phase position within a focal depth while minimizing an amount of power consumption; and a lens position-controller configured to control said lens driver based on the drive amount set by said driver thereby controlling the movement of said focusing lens, wherein the power consumption is minimized while a blurred image, having a blur causing the blurring of the image to be unrecognizable, is displayed on a monitor, when the single phase position is not within the focal depth and the position of the focusing lens is with the focal depth, a magnetic pole of the lens driver is moved to a position nearest to the single phase position within the focal depth, and the position nearest to the single phase position is distinct from a position that minimizes image blur.

3. The optical equipment according to claim 1, further comprising:

said lens driver;

a CPU for controlling said lens driver;

a CPU power controller configured to reduce power consumption of said CPU by reducing the computing speed of said CPU; and an excitation controller configured to reduce power consumption of said lens driver by reducing the excitation voltage to said lens driver.

* * * * *